Figure 1:
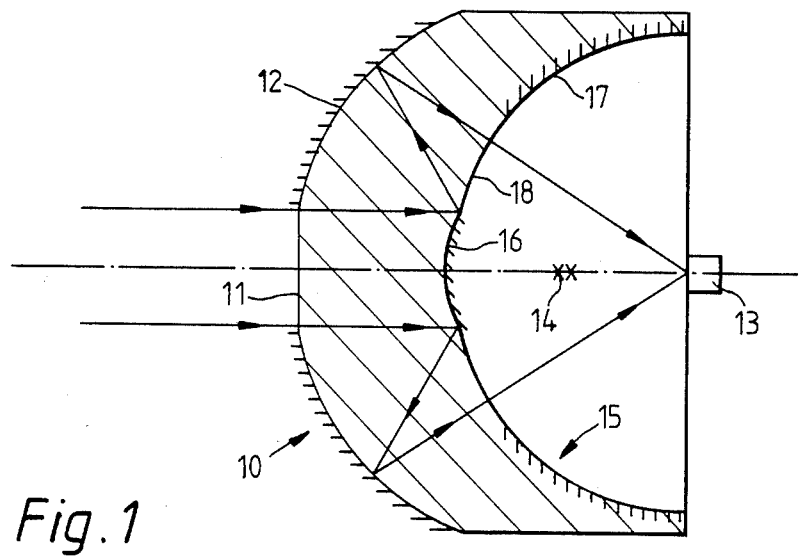

United States Patent [19]

Sillitto

[11] Patent Number: 4,554,448

[45] Date of Patent: Nov. 19, 1985

[54] OPTICAL ELEMENTS

[75] Inventor: Hillary G. Sillitto, Edinburgh, Scotland

[73] Assignee: Ferranti, plc, London, England

[21] Appl. No.: 487,991

[22] Filed: Apr. 25, 1983

[30] Foreign Application Priority Data

Apr. 27, 1982 [GB] United Kingdom ............... 8211818

[51] Int. Cl.⁴ ............................................. H01J 3/14
[52] U.S. Cl. .................................. 250/216; 350/1.4; 350/442; 350/443; 350/444; 350/620
[58] Field of Search ............................. 250/238, 216; 350/442–444, 620, 1.4

[56] References Cited

U.S. PATENT DOCUMENTS

| | | | |
|---|---|---|---|
| 2,520,635 | 8/1950 | Grey | 350/444 |
| 3,527,526 | 9/1970 | Silvertooth | 350/650 |
| 3,825,322 | 7/1974 | Mast | 350/444 |
| 4,342,503 | 8/1982 | Shafer | 350/443 |
| 4,392,710 | 7/1983 | Rogers | 350/444 |

Primary Examiner—Norman Morgenstern
Assistant Examiner—Janyce A. Bell
Attorney, Agent, or Firm—Kerkham, Stowell, Kondracki and Clarke

[57] ABSTRACT

An optical element for location between a source of radiation and a detector (13) includes a first optical surface (10) have a central transmissive area (11) and a surrounding area (12) reflective to radiation from direction of the detector (13). A second optical surface (15) is spaced from the first surface (10) towards the detector (13) and has a central reflective area (16) arranged to reflect radiation passing through area 11 towards the reflective area 12. A transmissive area (18) of the second surface (15) surrounds the central area (16), and is itself surrounded by a reflecting area (17) concentric with the detector (13) and forming a reflective shield for the detector.

9 Claims, 2 Drawing Figures

OPTICAL ELEMENTS

This invention relates to optical elements, and in particular to short focal length optical systems having a small f-number.

The invention is particularly concerned with an optical system for use with a detector sensitive to laser radiation at a wavelength of 10.6 microns. Unfortunately, a detector sensitive to such radiation is also sensitive to radiation emitted by any body at a temperature of about 300° K., i.e. fairly common ambient temperatures. Any such radiation originating outside the optical system of the detector constitutes noise in the detector, and steps have to be taken to reduce this. One way of doing this is to cool the detector and any surrounding material to a temperature well below 300° K. The problems of cooling a large volume are considerable. An alternative is to cool only the detector itself, and to ensure that surfaces outside the aperture of the optical system have high reflectivity towards the detector. If these surfaces are concentric with the detector, then the detector sees only its own reflection, and since it is cooled it sees only material at its own temperature. This latter solution is easier to achieve, since the mass to be cooled is relatively low.

The problem can be solved by using an aspheric single lens element outside the detector encapsulation, and providing either physical or reflective cold shielding for the detector. If the detector is small, and the optical system is required to have a small f-number, then a single aspheric lens would be very difficult to manufacture, and it would probably be necessary to use a larger lens in conjunction with a beam expander. Such an arrangement is difficult to align.

According to the present invention there is provided an optical element for location between a source of radiation and a detector thereof and arranged to focus radiation passing through an aperture therein on to the detector and to provided a reflective shield for the detector outside said aperture, which includes a first optical surface having a central area transparent to radiation incident thereon and a surrounding area reflective to radiation incident upon it from the direction of the detector, and a second optical surface spaced from the first optical surface towards the detector and having a first central area arranged to reflect radiation passing through the central area of the first surface towards the reflective area of the first surface, a second area of the first surface, a second area surrounding the first area and through which said radiation reflected from the reflective area of the first surface may pass towards the detector, and an outer area reflective towards and concentric with the detector to provide a reflective shield for the detector.

Preferably the optical element is formed from a single piece of optically transmissive material.

Figure 2:
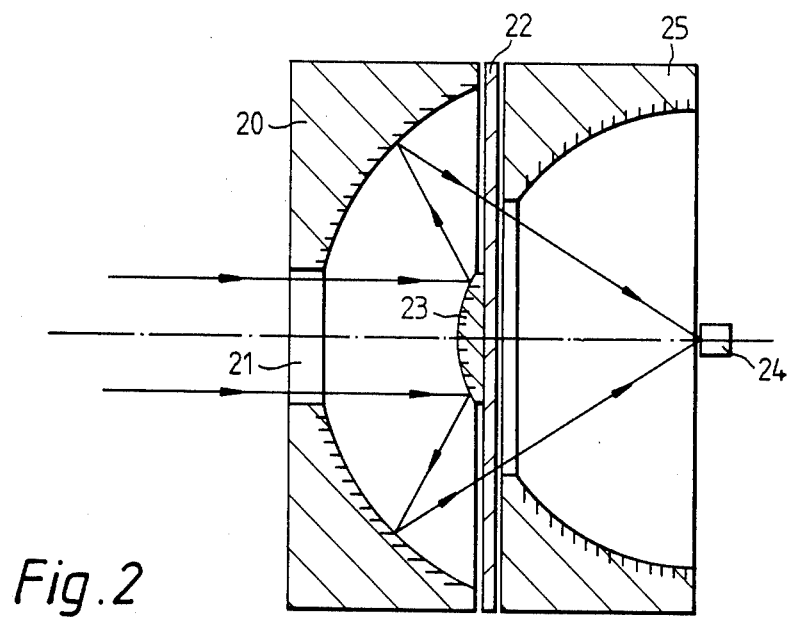

The invention will now be described with reference to the accompanying drawings, in which:

FIG. 1 is a sectional side view of an optical element according to a first embodiment of the invention; and FIG. 2 is a similar view of a second embodiment Referring now to FIG. 1, this shows an optical element formed from a solid block of material. The nature of the material depends upon the function of the element. If it is to be used at infra-red wavelengths then zinc selenide or germanium may be suitable, whereas glass may be used at visible wavelengths. The element has two optical surfaces each of complex shape. The first optical surface 10 is that nearer to the radiation source, and has a central plane portion 11 which defines the optical aperture of the element. This central area is transparent to radiation, but the surrounding area 12 of the first surface is made reflective to radiation incident upon it from the general direction of the detector 13. This is done by coating the outside of surface 12 with a suitable reflecting coating. The surface 12 has a centre of curvature 14 on the optical axis of the element and close to the effective focus of the element.

The second optical surface 15 of the element is that surface nearer to the detector 13, and has a part-spherical central area 16 having a centre of curvature very close to point 14. This central area is coated with a reflective coating so that radiation passing through the aperture 11 is reflected back towards surface 12. The remaining part 17 of the second surface is formed concentric with the active area of the detector 13. An inner band 18 of the surface 17 is left transparent to radiation reflected from surface 12 towards the detector, and the width of this band is determined by the aperture of the element. The outer part of surface 17 is coated with a reflective coating so as to form a reflective shield around the detector 13.

The path of radiation entering the element through the plane surface 11 is shown in the drawing. Outside the aperture of the element the detector 13 sees only its own reflection. If the detector is cooled to a suitable temperature then the detector will not itself generate radiation noise of the type referred to above.

Although an element of the type described above may have many applications, it is particularly suited to applications requiring a small physical size and small f-number optical system. By way of example only, an element having an aperture of 5 mm and a focal length of 5 mm has an f-number of 1. Such an optical system would be difficult to produce in other, more conventional ways.

Since both refracting surfaces 11 and 18 are normal to the rays passing through them, the refractive index of the material used for the element does not affect the performance of the element. For the same reason these two surfaces are free from spherical aberration and coma. The surface will preferably be coated with an anti-reflection coating. The two reflecting surfaces 12 and 16 are almost concentric to achieve optimum spherical aberration correction, and are also substantially free of coma. Since no refraction occurs the element is also free of longitudinal chromatic aberration, and of focal shifts due to the change of refractive index with temperature. The latter is a major problem with conventional small f-number refractive infra-red optical systems, particularly those using germanium. Due to the absence of refraction the component can be tested and focussed at any wavelength to which the material is transparent.

Instead of the fairly complex machinery necessary to form the element described above from solid, it is possible to build it up from an assembly of mirrors. Such an arrangement is shown in FIG. 2, and includes a filter to remove radiation of unwanted wavelengths.

Referring to FIG. 2, the first surface is formed by a spherical mirror 20 having a central aperture 21. Placed against the open end of mirror 20 is a filter 22, which will be of zinc selenide or germanium if infra-red radiation is used. The filter 22 supports the central reflector 23 of the second surface. The reflective shield around the detector 24 is provided by a reflector 25 concentric within the detector. A radial gap is left between the reflector 23 and mirror 25 to allow for the passage of radiation reflected from mirror 20 towards the detector 24.

The embodiment of FIG. 2 operates in precisely the same manner as that of FIG. 1, and has the same optical characteristics, except that dispersion in the filter will cause a small amount of longitudinal chromatic aberration. Additionally, less attenuation of the radiation takes place since the radiation passes only through the filter 22. It may be possible to omit the filter 22, though some form of support is then required for the central reflector 23.

What we claim is:

1. An optical element for location between a source of radiation and a detector thereof and arranged to focus radiation passing through an aperture therein on to the detector and to provide a reflective shield for the detector outside said aperture, which includes a first optical surface having a central area transparent to radiation incident thereon and a surrounding area reflective to radiation incident upon it from the direction of the detector, and a second optical surface spaced from the first optical surface towards the detector and having a first central area arranged to reflect radiation passing through the central area of the first surface towards the reflective area of the first surface, a second area surrounding the first area and through which said radiation reflected from the reflective area of the first surface may pass towards the detector, and an outer area reflective towards and concentric with the detector to provide a reflective shield for the detector.

2. An optical element as claimed in claim 1 in which the first reflective area of the first optical surface and the central area of the second optical surface are substantially concentric.

3. An optical element as claimed in claim 1 in which the first and second optical surfaces are the opposing surfaces of a solid body of material transparent to the radiation, the reflecting means being formed by coating the appropriate areas of the body with a radiation-reflecting coating.

4. An optical element as claimed in claim 3 in which the solid body is made of zinc selenide.

5. An optical element as claimed in claim 3 in which the solid body is made of germanium.

6. An optical element as claimed in claim 1 in which the reflecting areas of the first and second optical surfaces comprise separate reflecting surfaces.

7. An optical element as claimed in claim 6 which includes a filter arranged to pass only radiation of a required wavelength.

8. An optical element as claimed in claim 7 in which the filter is made of zinc selenide.

9. An optical element as claimed in claim 7 in which the filter is made of germanium.

* * * * *